EXAMINER

June 9, 1964 W. LIBEN ETAL 3,136,893

SIGNAL TRANSMISSION SYSTEMS USING SONIC LINES 165 700

Filed Jan. 11, 1962

INVENTORS
WILLIAM LIBEN
LESTER A. TWIGG, JR.
BY Herman L. Gordon
ATTORNEY

United States Patent Office 3,136,893

Patented June 9, 1964

3,136,893
SIGNAL TRANSMISSION SYSTEMS USING SONIC LINES

William Liben, 11404 Monticello Ave., Silver Spring, Md., and Lester A. Twigg, Jr., Rte. 2, Ellicott City, Md.

Filed Jan. 11, 1962, Ser. No. 165,700
7 Claims. (Cl. 250—199)

This invention relates to signal transmission systems, and more particularly to signal transmission systems wherein sonic lines are employed as components.

A main object of the invention is to provide a novel and improved signal transmission system employing a sonic line and radiant energy to which the sonic line is transparent, the radiant energy serving as a transmission link in the system and the sonic line serving as a means of modulating the radiant energy so that a signal will be transmitted or delayed in a desired manner by the reaction of the sonic line to sonic vibrations applied to the line, the sonic vibrations being modulated with the signal information.

A further object of the invention is to provide a novel and improved signal modulating and transmission system employing a sonic line in conjunction with a beam of radiant energy to impose a time delay on or to modulate a signal transmitted via said beam, the system involving relatively simple components, being reliable in operation, and being independent of polarizing properties of the material of which the line is composed, relying entirely on the fact that sound has a different rate of transmission through a material and that when the material is transparent, the transparency of the material is affected by the transmission of sound energy therethrough.

A still further object of the invention is to provide an improved means of establishing an accurately controlled variable time delay in the transmission of a signal from a source to a receiver, said means involving relatively inexpensive components, being easy to calibrate, and being relatively stable in its characteristics.

A still further object of the invention is to provide an improved modulated-light beam communication system employing a transparent sonic line as the light-modulating element thereof, the system being operable with any type of light beam and being independent of the polarizing characteristics of the light-modulating element.

Further objects and advantages of the invention will become apparent from the following description and claims, and from the accompanying drawings, wherein:

Figures 1, 1A, 2:
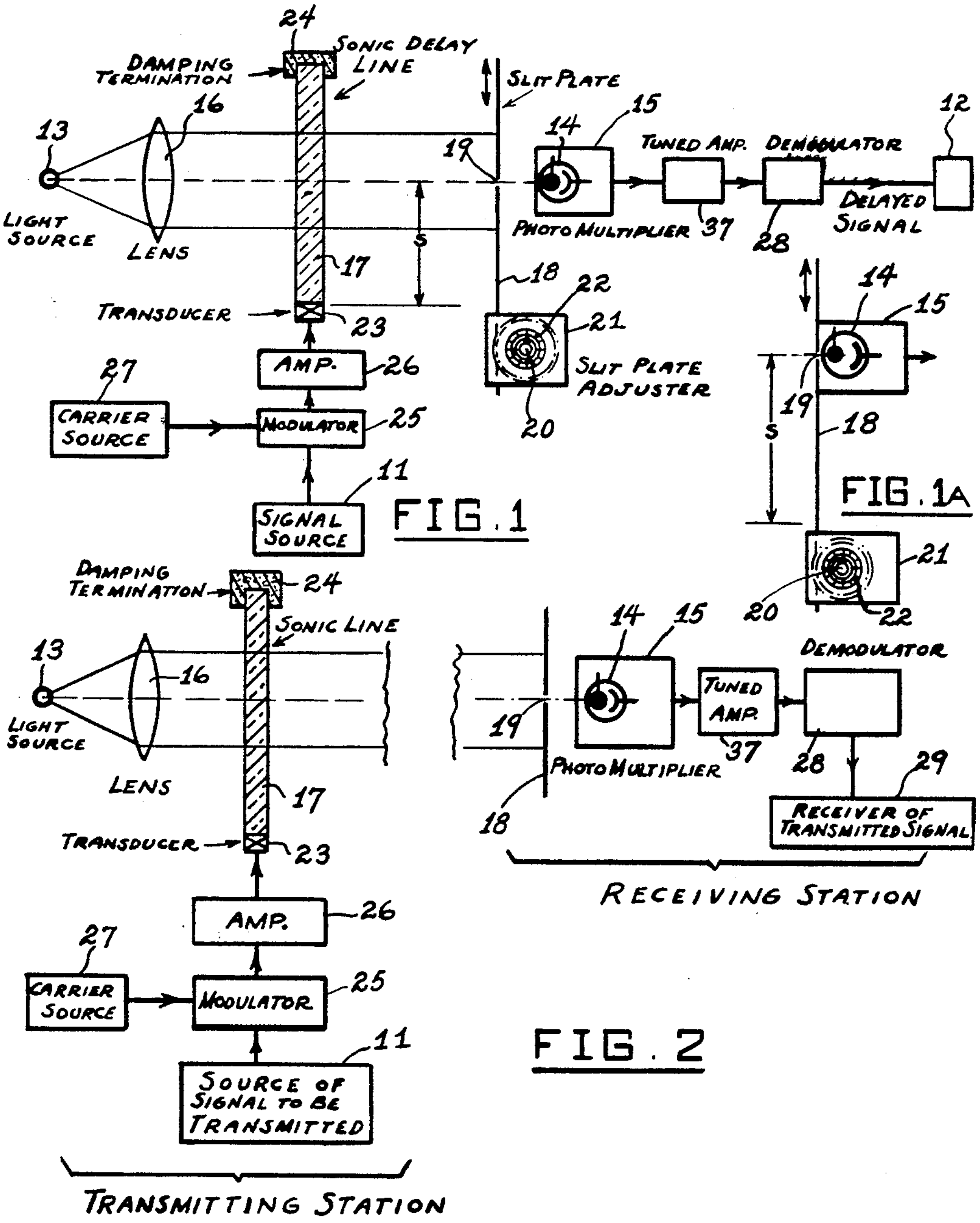
FIGURE 1 is a diagram of an improved signal transmission system according to the present invention, arranged as a signal variable delay means.
FIGURE 1A is a diagrammatic illustration of a modification of a portion of the signal transmission system of FIGURE 1.
FIGURE 2 is a diagram of another improved signal transmission system according to the present invention, arranged as a modulated-light beam communication system.

Referring to the drawings, and more particularly to FIGURE 1, 11 designates the source of a signal which it is desired to transmit to a device 12 with an accurately predetermined time delay. Designated at 13 is a light source emitting light of sufficient intensity and of suitable spectral composition to produce a photoelectric current in the photomultiplier cell 14 of a conventional photomultiplier detector unit 15. A lens 16 is mounted in a position to collect light from source 13 and to direct the light rays toward the photomultiplier cell 14. If the source 13 is of sufficient intensity, the lens 16 may be omitted.

The light rays from source 13 pass through a transparent sonic delay line 17, mounted substantially transverse to the light path between source 13 and cell 14, as shown, and are incident on a slit plate 18 arranged parallel to the sonic line and being adjustable transversely, namely, in a direction parallel to the direction of the sonic line. The slit plate 18 is provided with the slit 19 and may be provided with suitably calibrated adjusting means, for example, may be coupled mechanically, as by suitable rack and gear means, to a rotatable pointer knob 20 of a slit plate adjusting unit 21, the housing of the unit being provided on its front wall with a circular scale 22 by means of which the pointer knob 20 may be set to provide a desired signal time delay.

The sonic delay line 17 comprises any light transmitting medium in which sonic waves can be transmitted. Thus, a transducer 23 is drivingly coupled to one end of the sonic delay line 17, said transducer being adapted to generate sound waves and to transmit same to the sonic line 17. The sonic line 17 is acoustically coupled at its opposite end to a sound absorber 24 which acts as a termination for the sonic line and which prevents reflections of sound waves back through the line.

The sonic line 17 may comprise fused quartz, glass, or any other material capable of transmitting sound waves and having sufficient transparency to permit light rays from the source 13 to reach and act upon the cell 14.

The transducer 23 may be a piezoelectric, ferro-electric or magnetostrictive device. The device 23 is preferably a tuned device having a well-defined resonant frequency.

The transducer 23 is driven from the signal source 11 through a modulator 25 and an amplifier 26. The output of a carrier source 27, providing a signal of a frequency substantially equal to that of the resonant frequency of the transducer 23, is mixed with the signal from the source 11 in the modulator 25, and the resultant modulated carrier frequency is amplified in the amplifying device 26 and is applied to the transducer 23. The transducer converts the resultant electrical signals into vibratory signals. Since the transducer is bonded to the sonic line 17, the vibratory signals produce corresponding sonic signals in the line 17 which travel down the line.

The transparency of any point along the line is modified in accordance with the sonic signal intensity at that point, so that the intensity of the light rays passing through said point is modulated accordingly. Since a definite time is required for the sonic signals to travel from the transducer to a point on the line 17 which is in alignment with the light source and the slit 19, namely, to travel through the distance *s* in FIGURE 1, the light modulations are delayed accordingly.

The modulated light rays passing through the slit 19 impinge on the cell 14, generating a correspondingly modulated electrical signal in the photomultiplier unit 15. The output of the unit 15 is amplified in an amplifier 37, tuned to the frequency of carrier source 27, and the output of tuned amplifier 37 is demodulated in a conventional demodulator 28 to separate the information signal from the carrier. The resultant demodulated information signal is received by the device 12. The demodulated information signal is substantially the same as that inserted at the modulator 25 by the source 11 but is delayed by the time required for the sonic pulse or wave to travel through the distance *s* in the delay line.

The distance *s* may be varied by moving either the slit 19 or the delay line and transducer combination in a direction transverse to the light rays, so that the delay time may be varied as desired. In FIGURE 1, the delay time may be varied by adjusting the slit plate 18 by means of the adjusting device 21, as above described.

As diagrammatically illustrated in FIGURE 1A, the photomultiplier unit 15 may be physically mounted so as to move synchronously with the slit plate 18, for example, by being physically attached thereto, so that the modulated light beam always impinges at the same point on the photomultiplier cell 14. This eliminates possible errors due to non-uniformity of the photosensitive emission surface of the cell 14, as well as extending the range of time delay adjustment beyond that corresponding to the physical length of the emission surface in the direction of adjustment of slit plate 19 in the arrangement of FIGURE 1.

FIGURE 2 diagrammatically illustrates a communication system employing a sonic transparent delay line 17 as a means for intensity-modulating light rays from a source 13 in accordance with information signals from a source 11. The transmitting station thus comprises the information signal source 11 which furnishes the signal to be transmitted to a modulator 25, thus modulating a carrier from a source 27. The modulated carrier is amplified in an amplifier 26 and applied to a transducer 23 resonant to the frequency of the carrier. The transducer 23 converts the amplified modulated electrical carrier signal into correspondingly modulated sonic vibrations. The transducer 23 is bonded to one end of the sonic line 17, so that the sonic vibrations travel down the sonic line and are absorbed at its opposite end in the damping termination 24.

At the receiving station a slit plate 18 is provided, said slit plate having a slit 19 arranged to receive light rays from the source 13 through the sonic line 17. A suitable photo-detection device 15, for example, a conventional photomultiplier detector unit, is arranged adjacent the slit 19 to receive light rays passing through the slit on the photo-sensitive element of its cell 14. The output of unit 15 is therefore an electrical signal modulated in the same manner as the light rays reaching the cell 14 through the slit 19. These light rays are modulated by the varying transparency of the delay line 17 at the region thereof which is substantially in the path of the radiation transmitted from the source 13 to the slit 19. If a collimating lens 16 is employed to provide parallel rays through the sonic line 17, any of these parallel rays passing through the slit 19 will be intensity-modulated by the sonic vibrations in the sonic line 17, so that the light rays reaching cell 14 from any portion of the illuminated area of sonic line 17 will be intensity-modulated by the sonic vibrations in the line.

The output of photomultiplier unit 15 is amplified in an amplifier 37 tuned to the carrier frequency, and the output of said amplifier is demodulated in a demodulator 28. The demodulated information signal is then delivered to a suitable receiving device for recording, reproduction, or other utilization.

The light source 13 need only be sufficiently intense to provide a beam of rays effective to activate the cell 14 after traversing the distance between the transmitting and receiving stations. Said light source may comprise a laser. The lens 16 is not necessary except to increase the efficiency of the system by acting as an efficient light collector and collimator.

In some cases the slit plate 18 may be omitted, and the photomultiplier unit 15 may serve as a receiver of the intensity-modulated light rays by direct exposure thereto.

While certain specific embodiments of signal transmission systems using sonic lines have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A signal transmission system comprising a transparent sonic line, a transducer coupled to one end of said sonic line, an information electrical signal source, an electrical carrier source, means to modulate the electrical carrier from said last-named source with the electrical information signal from said first-named source to provide a modulated electrical carrier, means to apply said modulated carrier to said transducer to generate modulated sonic wave energy travelling from said transducer down the sonic line, a light source, means to direct light rays from said light source through said sonic line from one side thereof substantially transverse thereto, an apertured plate member located on the other side of said line and having an aperture in a position to receive intensity-modulated light rays from said light source passing through the line, photoelectric detector means adjacent said aperture and located to receive the intensity-modulated light rays and to generate an electrical modulated carrier corresponding to the intensity modulations of said light rays, means to demodulate said generated electrical carrier, and means to vary the distance between the aperture and the transducer in a direction parallel to the sonic line without changing the optical transmission characteristics of the aperture with respect to the intensity modulated light rays, whereby to provide a variable time delay between the original information signal and the corresponding resultant demodulated signal.

2. The structure of claim 1 and wherein said distance-varying means comprises a unit having a rotatable adjusting element, and rack and gear means coupling said adjusting element to said apertured plate member.

3. The structure of claim 1 and wherein said photoelectric detector means is mounted on said apertured plate member.

4. The structure of claim 1, and wherein said photoelectric detector means is mounted on said apertured plate member and wherein said distance-varying means comprises a unit having a housing provided with a circular scale on a wall thereof, a rotatable adjusting element having a pointer member movable along said scale, and rack and gear means coupling said adjusting element to said apertured plate member.

5. A signal transmission system comprising a transparent sonic line, a transducer coupled to one end of said sonic line, an information electrical signal source, an electrical carrier source, means to modulate the electrical carrier from said last-named source with the electrical information signal from said first-named source to provide a modulated electrical carrier, means to apply said modulated carrier to said transducer to generate modulated sonic wave energy travelling from said transducer down the sonic line, a light source, means to direct light rays from said light source through said sonic line from one side thereof substantially transverse thereto, an apertured plate member located on the other side of said line and having an aperture in a position to receive passing through the line, photoelectric detector means adjacent said aperture and located to receive the intensity-modulated light rays and to generate an electrical modulated carrier corresponding to the intensity modulations of said light rays, means to demodulate said generated electrical carrier, and means to adjust the position of said apertured plate member in a direction parallel to the sonic line without changing the optical transmission characteristics of the aperture with respect to the intensity modulated light rays, whereby to provide an adjusted time delay between the original information signal and the corresponding resultant demodulated signal.

6. A signal transmission system comprising a transparent sonic line, a transducer coupled to one end of said sonic line, an information electrical signal source, an electrical carrier source, means to modulate the electrical carrier from said last-named source with the electrical information signal from said first-named source to provide a modulated electrical carrier, said transducer being resonant to the frequency of said electrical carrier, means to apply said modulated carrier to said transducer to generate modulated sonic wave energy travelling from said transducer down the sonic line, a light source, means to direct light rays from said light source through said sonic line from one side thereof substantially transverse thereto, an apertured plate member located on the other side of said line and having an aperture in a position to receive intensity-modulated light rays from said light source passing through the line, photoelectric detector means adjacent said aperture and located to receive the intensity-modulated light rays and to generate an electrical modulated carrier corresponding to the intensity modulations of said light rays, means to demodulate said generated electrical carrier, and means to adjust the position of said apertured plate member in a direction parallel to the sonic line without changing the optical transmission characteristics of the aperture with respect to the intensity modulated light rays, whereby to provide an adjusted time delay between the original information signal and the corresponding resultant demodulated signal.

7. A signal transmission system for obtaining a time delay of an input information signal comprising a transparent sonic line, a transducer coupled to one end of said sonic line, an input electrical signal source, an electrical carrier source, means to modulate the electrical carrier from said last-named source with the input electrical signal from said first-named source to provide a modulated electrical carrier, means to apply said modulated carrier to said transducer to generate wave energy modulated with said input information signal travelling from said transducer down the line, a light source, means to direct light rays from said light source through said sonic line from one side thereof substantially transverse thereto at a location spaced from said transducer, photoelectric detector means located on the other side of said line to receive intensity-modulated light rays from said light source passing through the line and to generate an electrical modulated carrier corresponding to the intensity modulations of said light rays and wherein the modulations of the carrier represent the input information signal delayed by travelling through the sonic line, and means to demodulate said generated electrical carrier.

References Cited in the file of this patent

UNITED STATES PATENTS

| | | |
|---|---|---|
| 2,515,054 | Pagliarulo | July 11, 1950 |
| 2,557,974 | Kibler | June 26, 1951 |
| 2,634,366 | Schimpf | Apr. 7, 1953 |
| 2,707,749 | Mueller | May 3, 1955 |
| 2,781,495 | Frederick | Feb. 12, 1957 |